Patented Mar. 11, 1930

1,750,287

UNITED STATES PATENT OFFICE

NORBERT SPECHT, OF ORANIENBURG, NEAR BERLIN, GERMANY, ASSIGNOR TO DEUTSCHE GASGLÜHLICHT-AUER-GESELLSCHAFT MIT BESCHRÄNKTER HAFTUNG, OF BERLIN, GERMANY, A CORPORATION OF GERMANY

PROCESS OF PRODUCING PERMANENT PAINTS

No Drawing. Application filed October 21, 1925, Serial No. 64,032, and in Germany October 31, 1924.

It is known that paints, especially oil paints, are unfavorably affected in their properties by small quantities of free acid and alkalies. For instance in the case of white oil coatings small quantities of free acid will cause the white colour to turn yellow in a relatively short time. This change of colour must be ascribed to the action of the acid on the oil.

For this reason it has been the practice in the manufacture of paints to choose the oils used for that purpose free from strong acids and to employ pigments which do not contain compounds yielding strong acids by hydrolysis. This will apply both to white and colored pigments. In case such acid pigments are neutralized by means of alkalies it will easily happen, that alkali will remain even after having been washed intensively, such residue of alkali unfavorably affecting the color.

According to the present process it is possible to neutralize and render harmless the small quantities of acid adhering to the pigments by means of oxide of zinc or hydrate of oxide of zinc. The excess oxide of zinc will in no way unfavorably affect the oil, on the contrary in certain cases it will show some advantages in the application of the paint. This process is particularly valuable for producing white colors from titanium oxide. According to the new process, the major part of the acid adhering to the titanium oxide after its precipitation is removed by means of washing. Thereupon partial neutralization is effected by means of alkali so that a small amount of acid will stick to the titanium oxide. The remaining acid is then neutralized by means of an excess of oxide of zinc, and subsequently the product is filtered, washed, dried and heated to incandescence. Neutralization can also be effected by kneading the moist titanium oxide with oxide of zinc. Such colors have proved to be particularly durable. In this admixture the oxide of zinc is surpassed by no other of the oxides tested as regards its favorable action.

It has been found that in most cases an addition of about 5 per cent of oxide of zinc will suffice for effecting the neutralization quickly.

Paints thus obtained will surpass as regards their durability, titanium colors which are neutralized with alkali and which subsequently receive an addition of oxide of zinc or other basic compounds of zinc. Mixtures which consist of titanium oxide and barium sulfate or other pigments are treated in the same manner.

The pigments thus obtained may then be mixed with other known white or coloured pigments. Further quantities of oxide of zinc, barium sulfate or other desired additions may be mixed with the pigments thus obtained and afterwards be heated to incandescence.

Where in the appended claim I have specified zinc oxide, I desire it to be understood that hydrate of zinc oxide is intended to be included as an equivalent.

I claim:

The process of treating a titanium oxide pigment contaminated by acid adhering thereto, which consists in washing such pigment to remove the major portion of said adhering acid, then removing a further portion of such acid by neutralization with an alkali, then neutralizing the remaining portion of such acid by kneading with about five per cent of zinc oxide, filtering, washing and drying the resulting product, and heating it to incandescence.

In testimony whereof I affix my signature.

NORBERT SPECHT.